US012732477B2

(12) United States Patent
Alarcon

(10) Patent No.: US 12,732,477 B2
(45) Date of Patent: Sep. 8, 2026

(54) METHOD FOR DETERMINING WHETHER AN IP ADDRESS IS ATTRIBUTED TO A TERMINAL IN A COMMUNICATION NETWORK

(71) Applicant: SAGEMCOM BROADBAND SAS, Rueil Malmaison (FR)

(72) Inventor: Laurent Alarcon, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 17/583,502

(22) Filed: Jan. 25, 2022

(65) Prior Publication Data

US 2022/0247713 A1 Aug. 4, 2022

(30) Foreign Application Priority Data

Jan. 29, 2021 (FR) ....................................... 2100885

(51) Int. Cl.
*H04L 61/5046* (2022.01)
*H04L 61/5038* (2022.01)
(Continued)

(52) U.S. Cl.
CPC ...... *H04L 61/5046* (2022.05); *H04L 61/5038* (2022.05); *H04L 61/5069* (2022.05); *H04L 61/5092* (2022.05)

(58) Field of Classification Search
CPC ............. H04L 61/5007; H04L 61/5038; H04L 61/5046; H04L 61/5092; H04L 2101/659
See application file for complete search history.

(56) References Cited

U.S. PATENT DOCUMENTS

2003/0177267 A1* 9/2003 Orava ................. H04L 61/5046 709/245
2008/0031183 A1* 2/2008 Aso ..................... H04L 61/5046 370/328

(Continued)

FOREIGN PATENT DOCUMENTS

EP 1841184 A1 10/2007
KR 101213159 B1 * 12/2012 ......... H04L 61/5046
WO 2013/064170 A1 5/2013

OTHER PUBLICATIONS

Gao, WO 2020/042899 A1, Mar. 5, 2020, WIPO, H04L 61/5046 (Year: 2020).*

(Continued)

*Primary Examiner* — Vivek Srivastava
*Assistant Examiner* — William C Mcbeth
(74) *Attorney, Agent, or Firm* — Williams Mullen; R. Brian Drozd

(57) ABSTRACT

A method for determining whether an IP address is attributed in a communication network including at least one gateway, said method implemented by the gateway and includes: configuring a filter to receive first address test messages, each first filtered address test message targeting an IP address and requesting any terminal to which the target IP address is attributed to send an address-signaling message; sending at least one second address test message targeting said target IP address; determining that the target IP address is attributed to a terminal if an address-signaling message having said target IP address as its source IP address is received; and determining that the target IP address is not attributed to a terminal if no address-signaling message having said target IP address as its source IP address is (Continued)

received when a number of second address test messages targeting said IP address sent exceeds a predefined threshold.

9 Claims, 4 Drawing Sheets

(51) Int. Cl.
*H04L 61/5069* (2022.01)
*H04L 61/5092* (2022.01)

(56) References Cited

U.S. PATENT DOCUMENTS

2010/0316019 A1* 12/2010 Liu .................... H04L 61/5046 370/331
2012/0054865 A1* 3/2012 Qin ...................... H04L 69/167 726/22
2012/0166798 A1* 6/2012 Perez ................. H04L 61/5092 713/168
2012/0331542 A1* 12/2012 Halpern ............. H04L 63/1458 726/13
2013/0201874 A1* 8/2013 Chen .................. H04L 61/5092 370/255
2013/0238769 A1* 9/2013 Asati .................... H04L 61/103 709/220
2014/0092779 A1* 4/2014 Seok .................. H04L 61/5046 370/254
2014/0325090 A1* 10/2014 Michelin ............ H04L 61/5046 709/245
2015/0222538 A1* 8/2015 Poggi ..................... H04L 61/58 370/392
2015/0295884 A1* 10/2015 Zhao .................. H04L 61/5046 709/245
2023/0247419 A1* 8/2023 Venkataramaiah .......................... H04L 61/5046 455/73
2024/0106795 A1* 3/2024 Hui .................... H04L 61/5092

OTHER PUBLICATIONS

Hinden et al., "IP Version 6 Addressing Architecture", Network Working Group RFC 4291, Feb. 2006 (Year: 2006).*
Narten et al., "Neighbor Discovery for IP version 6 (IPV6)", Network Working Group RFC 4861, Sep. 2007 (Year: 2007).*
Thomson et al., "IPV6 Stateless Address Configuration", Network Working Group RFC 4862, Sep. 2007 (Year: 2007).*
Oct. 27, 2021 Search Report issued in French Patent Application No. 2100885.

* cited by examiner

METHOD FOR DETERMINING WHETHER AN IP ADDRESS IS ATTRIBUTED TO A TERMINAL IN A COMMUNICATION NETWORK

TECHNICAL FIELD

The present invention relates to a method aimed at determining whether an IP address is attributed to a terminal in a communication network, and more particularly in a case where the IP address is attributed to the terminal by autoconfiguration.

PRIOR ART

A local area communication network may be interconnected with a wide area communication network by means of a gateway. Communications are then possible from the local area communication network to the wide area communication network, and vice versa, by sharing the same protocol, typically the IP protocol ("Internet Protocol"). At least one IP address must then be attributed to each terminal in the local area communication network for said terminal to be able to communicate with at least one other terminal via the local area communication network and optionally via the wide area communication network.

IP addresses can be attributed in accordance with various procedures, such as for example those described by the normative document RFC 4862 (RFC standing for "Request For Comments") or the normative document RFC 8415, in which the gateway or a DHCP ("Dynamic Host Configuration Protocol") server attributes all or part of an IP address to a terminal in the local area communication network that made an IP address request. One of the various existing procedures for attributing IP addresses, described by the normative document RFC 4862, relates to an autoconfiguration method implemented by the terminal wishing to assign itself an IP address. In such a case, the terminal itself selects its IP address by combining with a predefined prefix an additional part that can for example be chosen by the terminal in an arbitrary manner. Before assigning itself the selected IP address, the terminal must however first of all ensure that said IP address is not already being used by another terminal, in other words that said IP address is not already attributed to another terminal. The terminal must therefore check the availability of this IP address and can next, if the IP address is available, assign said IP address to itself. On the other hand, if the IP address selected is already attributed to another terminal, the terminal must select another IP address and once again check the availability of said IP address.

When a terminal assigns itself an IP address in accordance with the autoconfiguration method, no information indicating that said IP address is attributed is transmitted in the local area communication network as long as the terminal does not send any traffic. Thus the gateway does not obtain any indication making it possible to know that said IP address is actually attributed to said terminal and therefore does not know said IP address.

It is therefore desirable to overcome these drawbacks of the prior art. It is in particular desirable to provide a solution that enables the gateway to know an IP address attributed by the autoconfiguration method.

DISCLOSURE OF THE INVENTION

One object of the present invention is to propose a method for determining whether an IP address is attributed in a communication network comprising at least one gateway, said method implemented by the gateway comprising:

configuring a filter making it possible to receive first address test messages, each first filtered address test message targeting an IP address, referred to as the target IP address, and requesting any terminal to which the target IP address is attributed and receiving said first address test message to send an address-signalling message, on reception of a said first filtered address test message, sending at least one second address test message targeting said target IP address, determining that the target IP address is attributed to a terminal if an address-signalling message having said target IP address as its source IP address is received, and determining that the target IP address is not attributed to a terminal if no address-signalling message having said target IP address as its source IP address is received when a number of second address test messages targeting said target IP address that have been sent by said gateway exceeds a predefined threshold.

Thus the gateway can determine that an IP address is attributed to a terminal in a case where said terminal assigns said IP address to itself in the context of an autoconfiguration method.

According to a particular embodiment, a sending of a second address test message targeting said target IP address is separated in time from a previous sending of a second address test message targeting said target IP address by a period of predefined duration k.

According to a particular embodiment, each second address test message is sent to a global broadcast address, each terminal in the communication network receiving each message sent to said global broadcast address.

According to a particular embodiment, each address test message is sent to a multicast address, said multicast address being defined by a predefined prefix and by the last n bits of the target IP address, n being a predefined integer, each terminal in the communication network the IP address of which ends in said last n bits being supposed to be subscribed to said multicast address in order to receive each message sent to said multicast address.

According to a particular embodiment, each sending of a second address test message targeting the target IP address is done at an instant t such that $t=t0_i+k*(c_i+1)$, $t0_i$ being the instant of receiving the first address test message targeting said target IP address and $c_i$ being a test counter associated with said target IP address, and the method further comprises:

on reception of a said first filtered address test message, recording said target IP address in a table in association with the instant $t0_i$ of reception of said first address test message and with the test counter $c_i$ initialised to zero, where i represents an input index of the table, incrementing the test counter $c_i$ by one unit at each sending of a said second address test message targeting said target IP address, deleting the target IP address from the table if an address-signalling message having said target IP address as its source IP address is received, or when the number of second address test messages targeting said target IP address that have been sent by the gateway, without any address-signalling message received in return, exceeds the predefined threshold.

According to a particular embodiment, the method further comprises, for each first address test message targeting a filtered target IP address received, initialising a timer of predefined duration k at the instant $t0_i$ of receiving the first address test message, and in which each sending of a second address test message targeting said target IP address is done when the timer expires, and the method further comprises reinitialising said timer by the duration k at each sending by the gateway of a said second address test message targeting said target IP address if the number of second address test messages targeting said target IP address that have been sent by said gateway is below the predefined threshold.

According to a particular embodiment, the method further comprises, for each target address recorded in the table:

- initialising a timer of predefined duration k at the instant $t0_i$ of reception of a said first address test message targeting said target IP address only if the table is empty when said first address test message is received,
- sending a said second address test message targeting said target IP address only if the timer expires at the instant t such that $t=t0_i+k*(c_i+1)$, and the method further comprises, for all the target IP addresses of index i in the table:

- reinitialising the timer for a duration k' such that $k'=MIN((t0_i+k*(c_i+1)-t)$ when the timer expires.

Thus it is possible to use a single timer for all the target IP addresses in the table.

According to a particular embodiment, the method further comprises recording in the gateway each target IP address determined as being attributed to a terminal.

According to a particular embodiment, the method further comprises completing a neighbour table with said target IP address determined as being attributed to a terminal.

According to a particular embodiment, recording in the gateway the target IP address determined as being attributed to a terminal comprises obtaining, in the address-signalling message having said target IP address as its source IP address that was received, a MAC address of said terminal, and the method further comprises generating a firewall pinholing rule associated with said terminal identified by its MAC address.

Thus it is possible to generate a firewall rule adapted to each terminal in the communication network before said terminal sends any traffic.

The invention also relates to a gateway configured for determining whether an IP address is attributed in a communication network comprising said gateway, the gateway comprising:

- means for configuring a filter making it possible to receive first address test messages, each first filtered address test message targeting an IP address, referred to as the target IP address, and requesting any terminal to which the target IP address is attributed and receiving said first address test message to send an address-signalling message,
- means for sending, on reception of a said first filtered address test message, at least one second address test message targeting said target IP address,
- means for determining that the target IP address is attributed to a terminal if an address-signalling message having said target IP address as its source IP address is received, and
- means for determining that the target IP address is not attributed to a terminal if no address-signalling message having said target IP address as its source address is received when a number of second address test messages targeting said IP address that have been sent by said gateway exceeds a predefined threshold.

The invention also relates to a computer program that can be stored on a medium and/or downloaded from a communication network, in order to be read by a processor. This computer program comprises instructions for implementing the method mentioned above in any one of the embodiments thereof, when said program is executed by the processor.

The invention also relates to an information storage medium storing such a computer program.

The invention also relates to a gateway comprising electronic circuitry configured for determining whether an IP address is attributed in a communication network comprising said gateway, the electronic circuitry being furthermore configured for:

- configuring a filter making it possible to receive first address test messages, each first filtered address test message targeting an IP address, referred to as the target IP address, and requesting any terminal to which the target IP address is attributed and receiving said first address test message to send an address-signalling message,
- sending, on reception of a said first filtered address test message, at least one second address test message targeting said target IP address,
- determining that the target IP address is attributed to a terminal if an address-signalling message having said target IP address as its source IP address is received, and
- determining that the target IP address is not attributed to a terminal if no address-signalling message having said target IP address as its source IP address is received when a number of second address test messages targeting said target IP address that have been sent by said gateway exceeds a predefined threshold.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figures 1, 2:
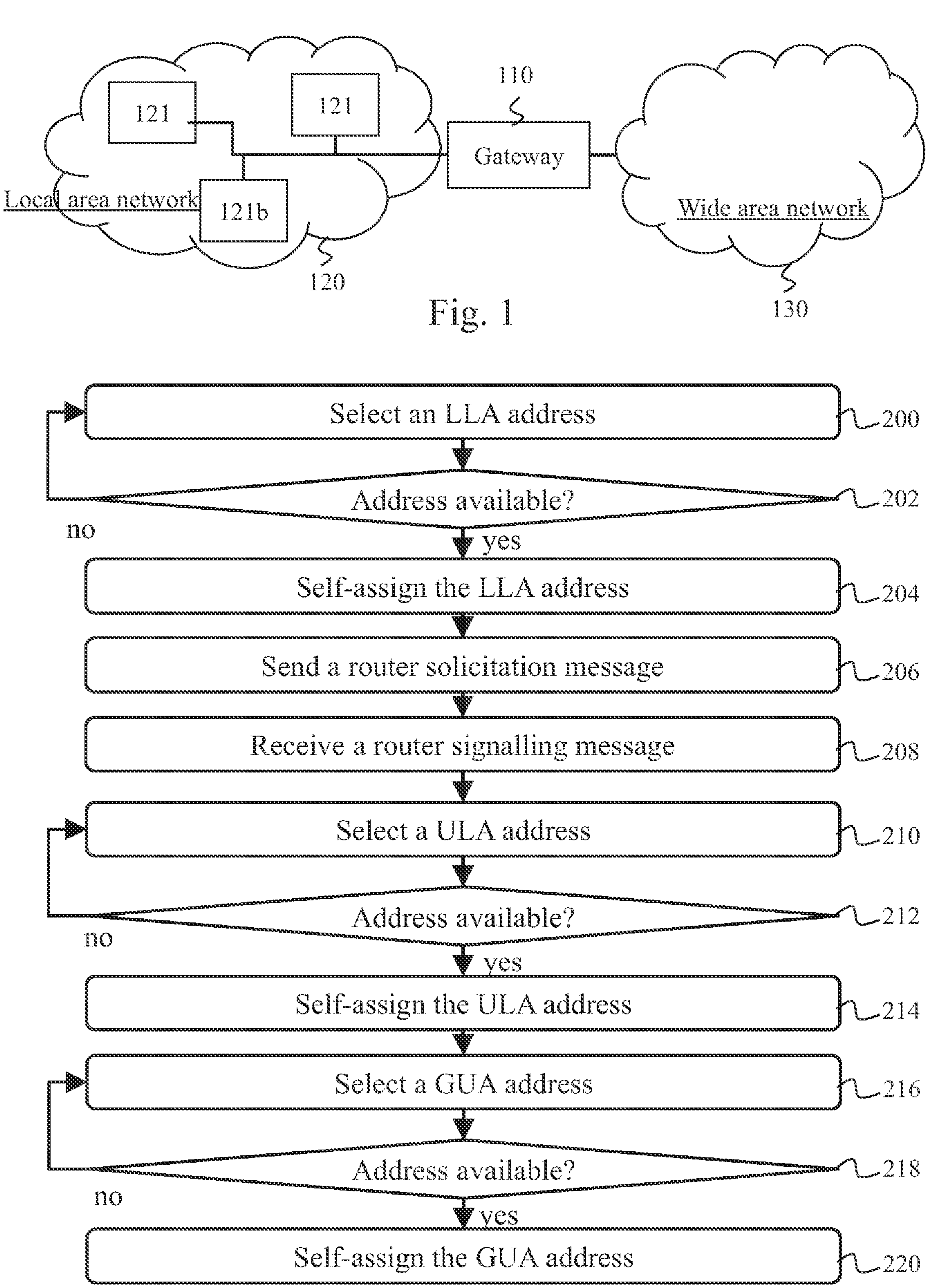
FIG. 1 illustrates schematically a local area communication network connected to a wide area communication network by means of a gateway, according to one embodiment.
FIG. 2 illustrates schematically a method for autoconfiguration of an IP address implemented by a terminal of the local area communication network, according to one embodiment.

FIG. 1 thus illustrates schematically a system having a local area communication network, referred to as the local area network 120, connected to a wide area communication network, referred to as the wide area network 130, by means of a gateway 110, according to one embodiment.

The local area network 120 or LAN network comprises at least one terminal 121 connected to the gateway 110. Each terminal 121 can communicate in the local area network 120 by exchanging data at the link layer of the OSI (Open Systems Interconnection) model, for example by means of an Ethernet protocol, a network switch or a Wi-Fi wireless communication protocol.

According to one example embodiment, the wide area network 130 is a WAN ("Wide Area Network") such as the internet. According to another example, the local area network 120 is a subnetwork of another wider network, referred to as a wide area network 130.

According to one particular embodiment, the gateway 110 is a residential gateway providing access to the internet for the terminals 121 of the local area network 120.

The local area network 120 and the wide area network 130 can communicate with each other by exchanging data, in the form of packets, at the network layer of the OSI model by virtue of the use of a common protocol such as the IP protocol (Internet Protocol). The IPv6 protocol (version 6 of the Internet Protocol) is advantageously used. At least one IP address must therefore be attributed to each terminal 121 of the local area network 120 so that said terminal 121 can communicate in the system of FIG. 1.

One way of attributing an IP address to a terminal 121 is to use an autoconfiguration method, as described by the normative document RFC 4862 (RFC standing for "Request for Comments"). A terminal 121*b* that does not have an IP address can therefore implement said autoconfiguration method to assign itself at least one IP address. According to one particular embodiment, a terminal 121 can assign three distinct IP addresses, each of said three IP addresses belonging to a different address class and each address class having a different routing range. Furthermore, each IP address attributed to a terminal 121 must be unique in its use context, in other words in the routing range of said IP address. Thus an IP address can be attributed to a terminal only if no other terminal located within range of said IP address uses the IP address in question, in other words if said IP address is not attributed to any other terminal. For example, for an address class the range of which extends solely to the local area network 120, the IP address attributed to a terminal 121 of the local area network 120 is distinct from the IP addresses attributed to the other terminals 121 of said local area network 120.

More particularly, the first address class is a link local address, referred to as LLA (LLA standing for "Link Local Address") that makes it possible to communicate solely with direct neighbours, without hops or relays (e.g. by a direct radio transmission when the local area network 120 is a wireless local area network WLAN ("Wireless LAN"). The LLA address is attributed solely by autoconfiguration or by static allocation. The LLA address is not routable, but makes it possible to communicate with a network neighbourhood and to obtain from said network neighbourhood routing information (discovery of routers etc.). To guarantee that each LLA address attributed is unique, a method of checking IP address availability is implemented, such as the DAD mechanism (DAD standing for "Duplicate Address Detection") defined by the normative document RFC 4862.

The second address class is a private address, referred to as a ULA address (ULA standing for "Unique Local Address"). The ULA address is routable only in the local area network 120 and enables a terminal 121 to communicate in the context of said local area network 120. The routing range of a ULA address thus extends to the local area network 120. A ULA address can be attributed either by autoconfiguration or by a server known as a DHCP server (DHCP standing for "Dynamic Host Configuration Protocol"). In the case of an attribution by the DHCP server, the unicity of a ULA address is guaranteed by said DHCP server. In the case of an attribution by autoconfiguration, a dedicated IP prefix is supplied by the gateway 110 and the method for checking IP address availability is next implemented to ensure unicity of each ULA address attributed, such as the DAD mechanism, as already mentioned with respect to the LLA addresses.

The third address class is a global address, referred to as a GUA address (GUA standing for "Global Unicast Address"). The GUA address is routable globally. In other words, the routing range of a GUA address extends to the local area network 120 and to the wide area network 130. The GUA address is for example used for communicating in the internet. As with a ULA address, a GUA address can be attributed by a DHCP server that guarantees the unicity of said GUA address, or by autoconfiguration. In the case of autoconfiguration, the unicity of the GUA address is guaranteed by the broadcasting of a unique IP prefix per network and by the implementation of the method for checking IP address availability, such as the DAD mechanism, as already mentioned with respect to LLA addresses.

Furthermore, broadcast IP addresses are used in the local area network 120. A first broadcast IP address is a global broadcast address, referred to as "all-nodes multicast", used for sending messages to each terminal 121 in the local area network 120. Thus each terminal 121 receives each message sent to said global broadcast address. In the context of the IPv6 protocol, the global broadcast address is written ff02::1.

Other broadcast IP addresses are multicast addresses, referred to as "solicited-node multicast". Each multicast address is used for sending messages to a predefined set of terminals 121 of the local area network 120. Each terminal 121 in a predefined set of terminals 121 (the constitution of which is explained below) must subscribe to the multicast address associated with said predefined set of terminals 121. Thus each terminal 121 in said predefined set of terminals 121 receives each message sent to said multicast address. The multicast addresses make it possible to communicate with a plurality of terminals 121 at a time without however using the global broadcast address, in order to limit the traffic.

A multicast address is constructed by taking a predefined prefix and adding thereto the last n bits of the IP address of the at least one terminal 121 with which the broadcast address is associated, n being a predefined integer, typically n=24. For example, in the context of the Ipv6 protocol, the predefined prefix used is of 104 bits and is written ff02:0:0:0:0:1:ff0::/104, and the multicast address to which a terminal 121 subscribes is constructed by adding thereto the last 24 bits of the IP address of the terminal 121 in question. Thus all the terminals 121 the IP address of which ends in the same last 24 bits belong to the same predefined set of terminals 121 and receive each message sent to the same multicast address. A multicast address corresponds to each IP address, whatever the address class to which the IP address belongs. For example, in one embodiment, if a terminal 121 is attributed an LLA address, a ULA address and a GUA address, said terminal 121 subscribes to three distinct multicast addresses each corresponding respectively to its LLA address, to its ULA address and to its GUA address.

FIG. 2 illustrates schematically the autoconfiguration method for three IP addresses, with distinct communication ranges (LLA, ULA, GUA), for the same terminal 121. The principle described can apply for a different quantity of IP addresses, with distinct communication (i.e. routing) ranges. The principle described can in particular apply for attributing a single IP address.

The principle of the autoconfiguration method is selecting an IP address, checking that the IP address is available, in other words ensuring that no other terminal is concurrently using said IP address, and, if the IP address is available, self-assigning said IP address. The IP address is selected in accordance with a predefined format, and may or may not require, depending on the address class in question, a predefined address prefix supplied by a router. The principle of the autoconfiguration method can thus be implemented by a terminal 121 as many times as said terminal 121 wishes to assign itself different IP addresses, each IP address having a distinct communication (i.e. routing) range. The terminal 121 sometimes comprises a plurality of communication interfaces, each being able to have IP addresses obtained by the autoconfiguration method.

In a first step 200, the terminal 121*b* selects an LLA address. In other words the terminal 121*b* selects an LLA address in accordance with a predefined format, for example in an arbitrary manner or, according to another example, by deriving the LLA address from its MAC (medium access control) address, applying a predefined transformation rule.

In a following step 202, the terminal 121*b* checks whether the LLA address selected is available in its network neighbourhood. For this purpose, the terminal 121*b* implements the method for checking IP address availability as described below in relation to FIG. 3, making it possible to test whether the selected LLA address is available and therefore usable by the terminal 121*b* or whether the selected LLA address is already attributed to another terminal 121 and therefore not usable by the terminal 121*b*. The method for checking IP address availability thus makes it possible to guarantee the unicity of the LLA address in the network neighbourhood of the terminal 121*b*. If the selected LLA address is not available, the terminal 121*b* once again performs the step 200 in which the terminal 121*b* selects another LLA address. If the selected LLA address is available, the terminal 121*b* performs a step 204.

At the step 204, the terminal 121*b* assigns itself the available selected LLA address.

In a following step 206, the terminal 121*b* communicates in its network neighbourhood by means of its LLA address and then sends a router solicitation RS message, said router solicitation RS message making it possible to seek a router in the network neighbourhood of the terminal 121*b* and to obtain from said router information necessary for the autoconfiguration of at least one IP address with the longest communication range (i.e. routing range, here ULA and GUA addresses).

Let us consider that the gateway 110, which includes such a router, receives the router solicitation RS message transmitted at the step 206 and responds thereto by a router advertisement RA message.

In a following step 208, the terminal 121*b* then receives, coming from the gateway 110, the router advertisement RA message, comprising the information necessary for the autoconfiguration of ULA and GUA addresses, such as a ULA address prefix and a GUA address prefix.

In a following step 210, the terminal 121*b* selects a ULA address constructed from the ULA address prefix received in the router advertisement RA message at the step 208, and from an additional part comprising a predefined number of bits so that the total number of bits of the ULA address is in accordance with the IP address format. The additional part is for example selected arbitrarily or, according to another example, by deriving the ULA address from the MAC address of the terminal 121*b* by applying a predefined transformation rule.

In a following step 212, the terminal 121*b* checks whether the ULA address selected is available in the local area network 120. For this purpose, the terminal 121*b* implements the method for checking IP address availability described in FIG. 3, making it possible to test whether the ULA address selected is available and therefore usable by the terminal 121*b* or whether the ULA address selected is already attributed to another terminal 121 and therefore not usable by the terminal 121*b*. The method for checking IP address availability thus makes it possible to guarantee the unicity of the ULA address in the local area network 120. If the ULA address selected is not available, the terminal 121*b* once again performs the step 210 wherein the terminal 121*b* selects another ULA address. If the ULA address selected is available, the terminal 121*b* performs a step 214.

At the step 214, the terminal 121*b* assigns itself the available selected ULA address.

In a following step 216, the terminal 121*b* selects a GUA address constructed from the GUA address prefix received in the router advertisement RA message at the step 208, and from an additional part comprising a predefined number of bits so that the total number of bits of the GUA address is in accordance with the IP address format. The additional part is for example selected arbitrarily or, according to another example, by deriving the GUA address from the MAC address of the terminal 121*b* by applying a predefined transformation rule.

In a following step 218, the terminal 121*b* checks whether the GUA address selected is available. For this purpose, the terminal 121*b* implements the method for checking IP address availability described in FIG. 3, making it possible to test whether the GUA address selected is available and therefore usable by the terminal 121*b* or whether the GUA address selected is already attributed to another terminal 121 and therefore not usable by the terminal 121*b*. The method for checking IP address availability thus makes it possible to guarantee the unicity of the GUA address in the system of FIG. 1, i.e. in the local area network 120 and in the wide area network 130. If the GUA address selected is not available, the terminal 121*b* once again performs the step 216, wherein the terminal 121*b* selects another GUA address. If the GUA address selected is available, the terminal 121*b* performs a step 220.

At the step 220, the terminal 121*b* assigns itself the available selected GUA address.

Figure 3:
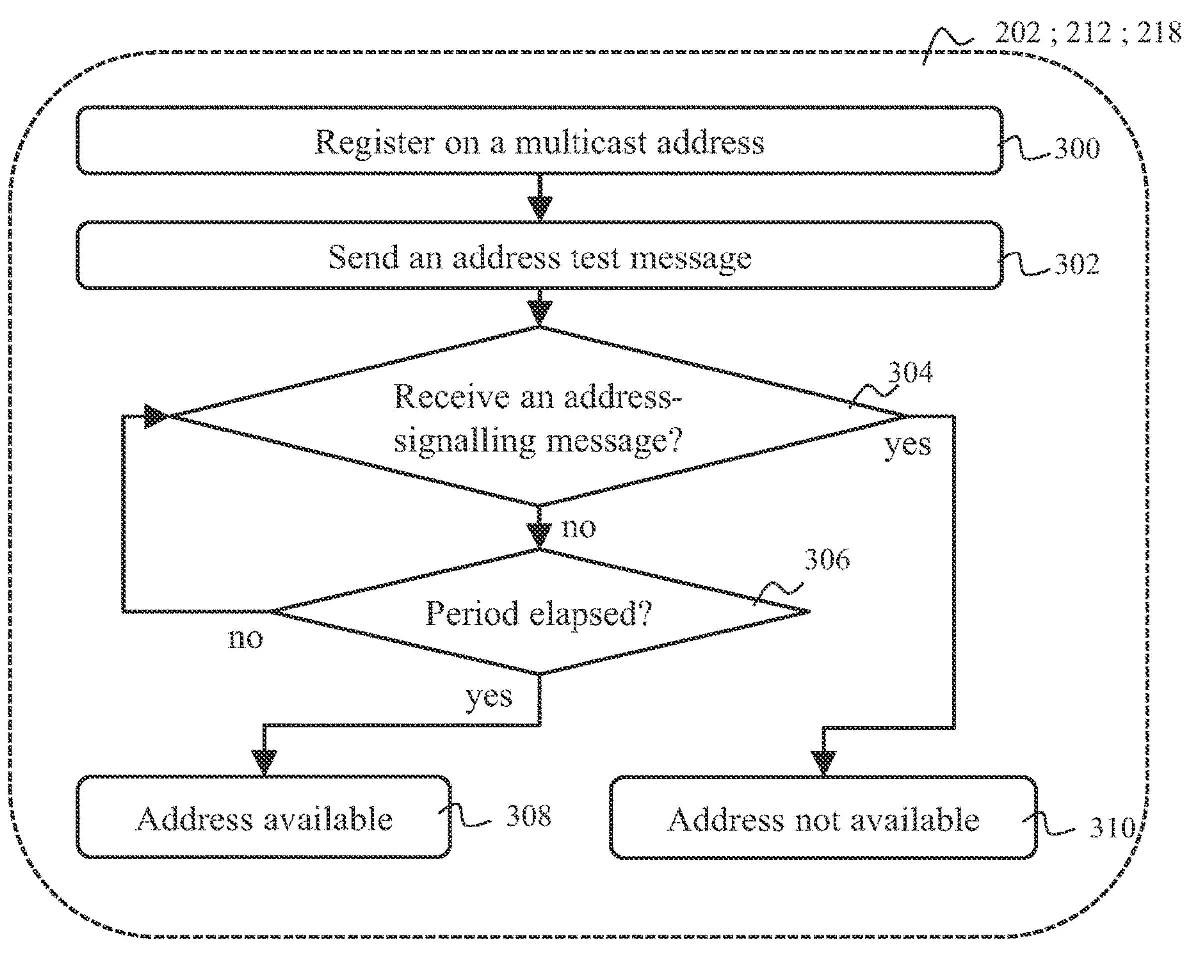
FIG. 3 illustrates schematically a method for checking IP address availability that is implemented in the method for autoconfiguring an IP address, according to one embodiment.

FIG. 3 illustrates schematically the method for checking availability of a selected IP address, in accordance with one embodiment. The method for checking IP address availability, such as for example the DAD mechanism defined by the normative document RFC 4862, can be implemented repeatedly in the method for autoconfiguration of a terminal, so as to obtain IP addresses with distinct communication (i.e. routing) ranges. With reference to FIG. 2, the method for checking IP address availability is implemented during the step 202 (LLA address), the step 212 (ULA address) and the step 218 (GUA address).

In a step 300, the terminal 121*b* subscribes to the multicast address associated with the IP address selected. The IP address selected corresponds to the LLA address selected, to the ULA address selected or to the GUA address selected during the respective steps 202, 212 or 218. Furthermore, the terminal 121*b* can optionally register itself on the global broadcast address of the local area network 120.

In a following step 302, the terminal 121*b* sends, to the multicast address, an NS (NS standing for "neighbour solicitation") address test message, as defined for example by the normative document RFC 4861. Alternatively, the terminal 121*b* sends said NS address test message to the global broadcast address. Said NS address test message comprises a source IP address that is null since no IP address is yet actually attributed to the terminal 121*b*. An NS address test message targets an IP address, referred to as the target IP address, indicated in a data field of the NS message, or in other words aims to seek whether said target IP address is already attributed to another terminal 121. The NS address test message thus comprises a data field containing the target IP address. A terminal 121 to which said target IP address was attributed (for example autoattributed) and which receives said NS address test message must then indicate its presence by sending in return an NA address-signalling message (NA standing for "Neighbour Advertisement"), as defined for example by the normative document RFC 4861. An NA address-signalling message comprises an ICMPv6 (standing for "Internet Control Message Protocol version 6") header comprising a source IP address, which then corresponds to the target IP address sought by the NS address test message, and a destination IP address that is the multicast address, or alternatively the global broadcast address, to which the NS address test message was sent. Said ICMPv6 header furthermore optionally comprises a physical link field (also called a "target link layer") that comprises the MAC address of said terminal 121. An NA address-signalling message furthermore comprises an Ethernet header that may comprise the MAC address of the terminal 121 sending said NA address-signalling message. The MAC address of said terminal 121 can therefore thus be obtained by scrutinising the content of the NA address-signalling message in question.

In a following step 304, the terminal 121*b* checks whether it has received an NA address-signalling message in return for the NS address test message previously sent at the step 302. If an NA address-signalling message has been received coming from a terminal 121 to which the target IP address is attributed, then a step 310 is performed. Otherwise a step 306 is performed.

At the step 306, the terminal 121*b* checks whether a first predefined period has elapsed since the instant of sending the NS address test message sent at the step 302. As long as said first period has not elapsed, the terminal 121*b* reiterates the step 304. If the first period has elapsed, the terminal 121*b* performs a step 308.

At the step 308, the terminal 121*b* considers that the IP address selected, corresponding to the target IP address, is available.

At the step 310, the terminal 121*b* has received an NA address-signalling message and considers therefore that the IP address selected is not available.

Figure 4:
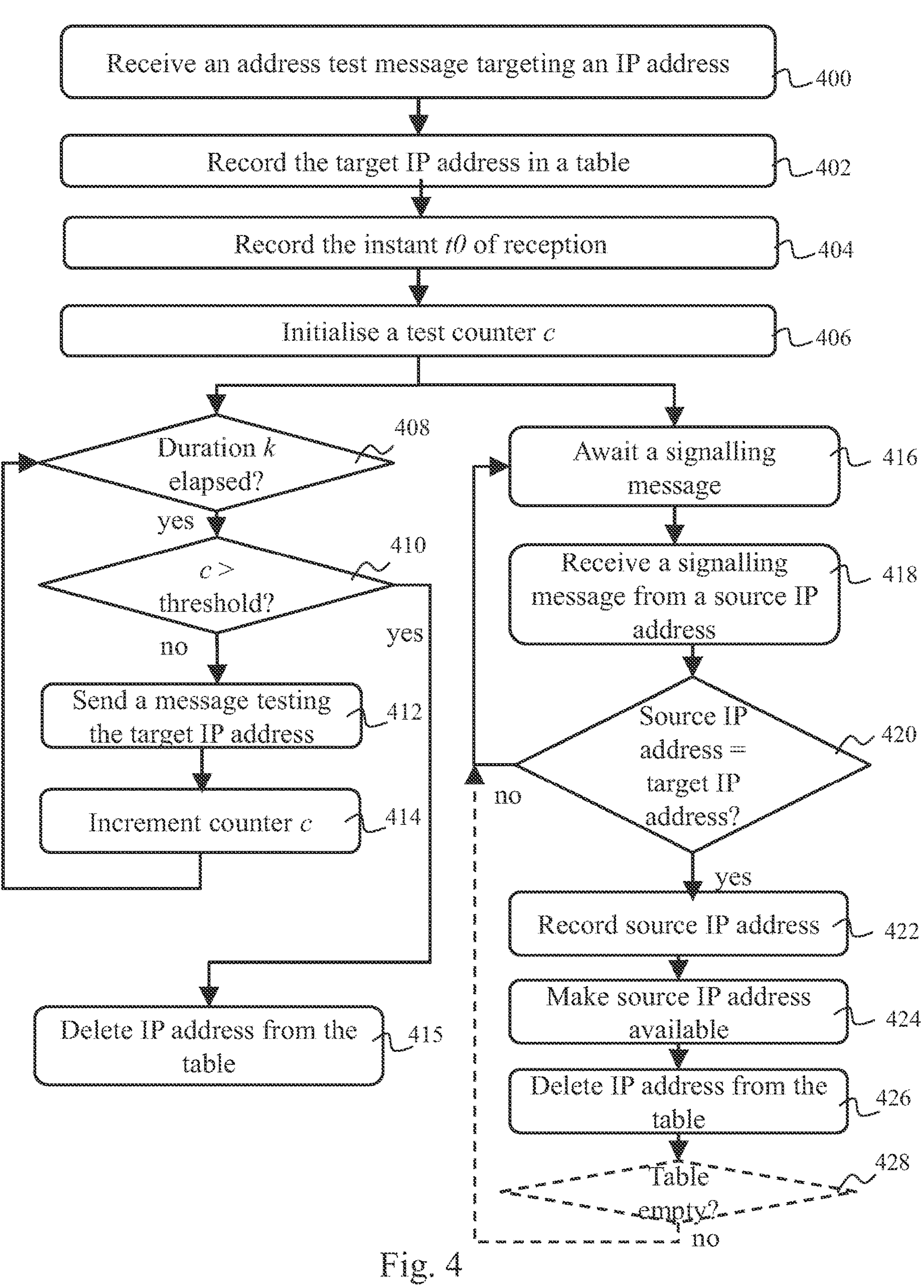
FIG. 4 illustrates schematically a method for determining whether or not an IP address is attributed to a terminal, according to one embodiment.

FIG. 4 illustrates schematically a method for determining whether or not an IP address is attributed to a terminal.

When an IP address is attributed to a terminal 121 by the autoconfiguration method, the gateway 110 does not obtain any indication making it possible to know that said IP address is actually attributed to said terminal 121 as long as said terminal 121 is not sending a message. The gateway 110 cannot therefore determine which IP addresses are attributed to the terminals 121 of the local area network 120. The gateway 110 overcomes this defect by means of the method described here in relation to FIG. 4.

It should be noted that it is not desirable for the gateway 110 to subscribe to all the existing multicast addresses in order to capture any NS and NA messages that might be transmitted via these multicast addresses, since these may be too numerous. For example, in the context of the IPv6 protocol, the gateway 110 would have to subscribe to 16 million multicast addresses in order to be able to capture the NS and NA messages that would make it possible to know which IP addresses are solicited for checking availability and respectively which IP addresses solicited are in conflict. It is therefore not desirable for the gateway 110 to monitor and analyse all the messages transmitted via the multicast addresses, the corresponding processing load being much too voluminous. Furthermore, even supposing that the gateway 110 is informed that a terminal is seeking to attribute an IP address to itself by the autoconfiguration method, the gateway 110 does not receive any indication of said terminal making it possible to ensure that said autoconfiguration method with the IP address in question has succeeded.

In a first step 400, the gateway 110 receives a first NS address test message targeting a target IP address, said first NS test message being able to come from the step 302 described above. To receive said NS address test message, the gateway 110 opens a termination point (or socket) making it possible to receive all the traffic exchanged by means of the IP protocol (advantageously, all the traffic exchanged by means of the IPv6 protocol) in the local area network 120, and generates a filter for extracting therefrom only the NS address test messages comprising a null source IP address. Thus each NS address test message comprising a null source IP address and sent either on a multicast address or on the global broadcast address is received and filtered, and can thus be analysed by the gateway 110.

In a following step 402, the gateway 110 records, in a table, an IP address corresponding to the target IP address obtained in the data field containing the target IP address of said NS address test message received.

In a following step 404, the gateway 110 records in the table, in association with the target IP address obtained, an instant t0 of reception of said NS address test message received.

In a following step 406, the gateway 110 enters in the table, in association with said target IP address obtained, a test counter c initialised to an initial value c0, such that c0=0. The gateway 110 next performs in parallel a step 408 and a step 416.

At the step 408, the gateway 110 determines whether a second period of predefined duration k has elapsed, said second period being counted as from the instant t0 of reception of the first NS address test message received or as from a previous instant of sending a second NS address test message (as described below). When said second period of duration k has elapsed, the gateway 110 validates the step 408 and performs a following step 410. In other words, the gateway 110 performs the step 410 at an instant t such that t=t0+k*(c+1). The duration k is predefined so as to enable a terminal 121 implementing the autoconfiguration method to finalise said autoconfiguration method. The duration k is equal for example to 5 s.

According to one embodiment, the second period of duration k is determined by means of a timer for each IP address recorded in the table. In other words, a new timer of duration k is initialised by the gateway 110 for each reception of a new first NS address test message comprising a target IP address different from any other IP address present in the table. Each timer is thus started by the gateway 110 at the instant t0 of reception of the NS address test message received in question. For each timer of duration k ending, the gateway 110 reinitialises said timer of duration k and sends a second NS address test message (as described below at a step 412).

According to an alternative embodiment, the gateway 110 initialises a single timer for all the IP address recorded in the table. The gateway 110 then implements a method for managing the single timer, as described below in relation to FIGS. 5 and 6.

At the step 410, the gateway 110 compares the test counter c with the predefined threshold, the predefined threshold being for example equal to 2. If the test counter c is not above said predefined threshold, a step 412 is performed. If the test counter c is above the predefined threshold, a step 415 is performed.

At the step 412, the gateway 110 sends a second NS address test message targeting the IP address recorded in the table at the step 402. Each second NS address test message is sent to the multicast address associated with said IP address recorded in the table, or alternatively to the global broadcast address.

Furthermore, the second NS address test message sent comprises a non-null source IP address, the gateway 110 using for example its LLA address as source IP address for sending messages. According to another example, the gateway 110 uses an IP address that is attributed to it and belongs to the same class as the target IP address. Thus said second NS address test message cannot be received by the gateway 110 in aid of the termination point coupled to the filter as mentioned at the step 400.

In a following step 414, the gateway 110 increments the test counter c by one unit. The step 408 is next reiterated. For example, in the case where the gateway 110 uses a distinct timer for each IP address in the table, the gateway 110 reinitialises the timer of duration k when said timer ends and when a second NS address test message is sent. According to another example, the gateway 110 reinitialises the single timer, when said single timer ends, and for a duration k' as defined in relation to a step 612 in FIG. 6.

At the step 415, the gateway 110 considers that the IP address recorded in the table at the step 402 has not been attributed and deletes said IP address from the table as well as the information that has been recorded therein in association with said IP address. This is because a situation where the test counter c is above the predefined threshold may represent the fact that the IP address of the first NS test message received at the step 400 has not been retained by the terminal 121 sending said first NS message.

At the step 416, the gateway 110 awaits reception of an NA address-signalling message. For this purpose, the gateway 110 opens another termination point making it possible to receive each NA address-signalling message sent via the multicast address that corresponds to the target IP address of the NS message sent at the step 412.

In a following step 418, the gateway 110 receives an NA address-signalling message and obtains the source IP address therefrom.

In a following step 420, the gateway 110 determines whether the NA address-signalling message is received in return for a second NS address test message sent. The gateway compares the source IP address of the NA address-signalling message received with each IP address recorded in the table. If said source IP address corresponds to one of said IP addresses recorded in the table, said IP address is attributed to a terminal and the gateway 110 performs a step 422. Otherwise the gateway 110 reiterates the step 416.

At the step 422, the gateway 110 obtains said IP address and records it as being an IP address attributed to a terminal 121. For example, the gateway 110 records the IP address in question in a neighbour table that enumerates the IP addresses of the terminals 121 of the local area network 120 seen by the gateway 110. The neighbour table comprises one input per IP address whatever the class of said IP address. For example, if an LLA address, a ULA address and a GUA address are attributed to a terminal 121, the neighbour table comprises three distinct entries each corresponding to the respective LLA, ULA and GUA addresses. The neighbour table further preferentially comprises the associated MAC address for each IP address, when said MAC address is known. The neighbour table then makes it possible to know the MAC address associated with said IP address. For example, the gateway 110 obtains said MAC address in the Ethernet header or in the optional physical link field of the ICMPv6 header of the NA address-signalling message. If the MAC address of the terminal 121 using said IP address attributed is obtained, the gateway 110 can then record said MAC address in association with the IP address attributed. According to one embodiment, the IP address attributed can be recorded automatically in the neighbour table of the gateway 110 by an operating-system module of the gateway 110. According to another embodiment, the IP address attributed is recorded by means of the execution, by the gateway 110, of an application function making it possible to update the neighbour table.

It should be noted that, in a case where said IP address is already known to the gateway 110 as being attributed to a terminal 121, the gateway 110 does not record said IP address a second time. This may be the case for example when a terminal **121*b* sends a first NS address test message targeting a target IP address already attributed to another terminal 121**.

The gateway 110 next performs a step 424.

At the step 424, the gateway 110 makes said attributed IP address available to services internal or external to the gateway 120 so that the services can use said IP address.

According to a first example, the gateway 110 uses a communication bus for communicating the attributed IP address. The communication bus may be a hardware bus or a software bus as disclosed in the international patent application WO 2013/087894 A1. For example, services internal to the gateway 110 register with a message broker in order to receive notifications representing updates of the neighbour table and are thus informed of the existence of said IP address attributed. More generally, the gateway 110 may use a communication interface, hardware or software, such as an application programming interface APT, for communicating the IP address attributed.

According to a second example, the gateway 110 displays in a graphical use interface GUI said attributed IP address, for example in the context of a display of the content of the neighbour table. To do this, the gateway incorporates a display, such as an LCD («liquid crystal display») screen. The gateway 110 can also transmit said attributed IP address, for example by transmitting the whole of the neighbour table, to an external device (for example a smartphone) for display on a screen of said external device.

According to a third example, the gateway 110 makes said attributed IP address available to a firewall, preferentially internal to said gateway 110. The firewall configures a firewall rule for the terminal 121 using the attributed IP address. The gateway 110 determines whether said terminal 121 requires a pinholing of a firewall and generates a pinholing rule for the firewall if such is the case. For example, the firewall pinholing follows a user configuration (e.g. via an application or a graphical interface) in order to allow the HTTP (Hypertext Transfer Protocol) or HTTPS (HTTP Secure) traffic coming from the wide area network 130 to a terminal 121 of the local area network 120 that hosts a server. The user selects the terminal 121 according typically to its MAC address, or a corresponding host name, but the configuration of the firewall is based on the IP address applicable. The gateway 110 then generates a specific pinholing rule for the firewall allowing passage of the traffic in question from the wide area network 130 to the local area network 120. For example, the gateway 110 generates a pinholing rule for the firewall specific to the web servers or to the email servers.

According to a fourth example, the gateway 110 makes said attributed IP address available to a controller, preferentially internal to said gateway 110, of a mesh wireless communication network comprising a plurality of access points each managing a wireless network. Said controller can thus transmit a configuration command to a terminal 121 to which said IP address is attributed even if said terminal 121 has not yet sent any traffic with its newly attributed IP address.

A step 426 is next performed.

At the step 426, said IP address is deleted from the table as well as the information that was recorded therein in association with said IP address.

According to a particular embodiment, at the step 420, the gateway 110 runs through the table in order to identify whether the source IP address of the NA address-signalling message received at the step 418 corresponds to an IP address recorded in the table. If said IP address does not correspond to any IP address recorded in the table, the gateway 110 ignores the NA address-signalling message and reiterates the steps 416. Otherwise the gateway 110 then performs the steps 422, 424 and 426 already described. The gateway 110 next performs a step 428 in which it determines whether the table is empty. If the table is not empty, the gateway 110 reiterates the step 416.

In general, to determine whether or not an IP address is attributed to a terminal 121 that implements the autoconfiguration method, the gateway 110 detects initially any target IP address that a terminal 121 is seeking to assign itself. The gateway 110 for this purpose detects the target IP address of each first NS address test message received, said first NS address test message requesting every terminal using said target IP address to identify itself by sending an NA address-signalling message. Such a first NS address test message comprises a null source IP address. Thus the gateway 110 can easily locate (by source address filtering) that a terminal is in the process of implementing the autoconfiguration method and detect the IP address that the terminal 121 wishes to assign itself.

Secondly, the gateway 110 itself tests the target IP address in order to determine whether said target IP address is actually attributed. For this purpose, the gateway 110 in its turn sends at least one second NS address test message targeting said target IP address.

The gateway 110 then detects whether an NA address-signalling message is received in response to the second NS address test message sent, in other words whether an NA address-signalling message comprising said tested target IP address as its source IP address is received within a period of predefined duration k following the sending of said second NS address test message. If such is the case, the gateway 110 determines that the target IP address is attributed to a terminal. The gateway 110 then obtains said target IP address and records it in the neighbour table. If no NA address-signalling message comprising said tested target IP address as its source IP address is received and a number of second NS address test messages targeting said target IP address sent exceeds a predefined threshold, the gateway 110 determines that the target IP address is not attributed.

Figure 5:
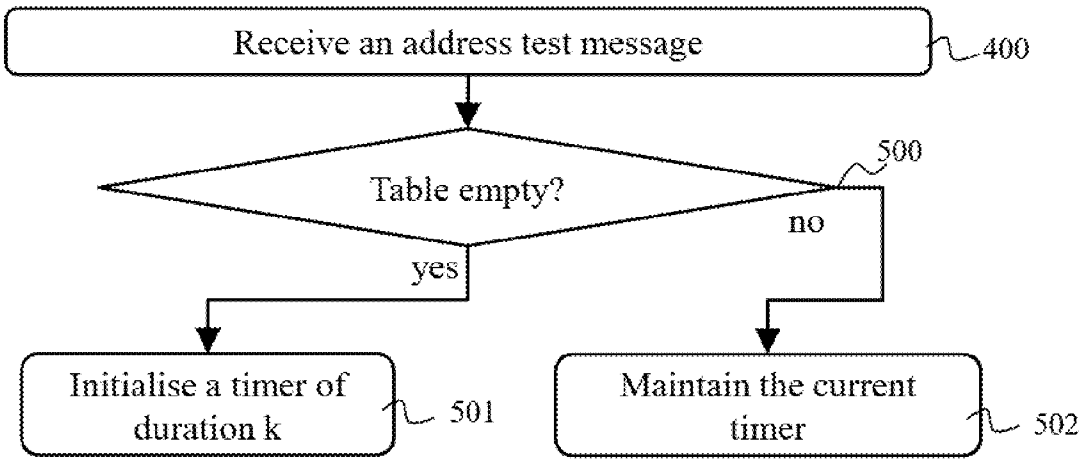
FIG. 5 illustrates schematically a first phase of a method for managing a single timer making it possible to measure a period of duration k, according to one embodiment.

FIG. 5 illustrates schematically a first phase of the method for managing a single timer making it possible to measure the second period of duration k for all the IP addresses in the table, in accordance with one embodiment. The method is implemented by the gateway 110.

In a first step 400, described in FIG. 4, the gateway 110 receives an NS address test message comprising a target IP address.

In a following step 500, the gateway 110 determines whether the table is empty at the moment of said reception of said NS address test message. If such is the case, a step 501 is performed. Otherwise a step 502 is performed.

At the step 501, the gateway 110 starts the single timer for a duration k.

At the step 502, the single timer is already started and remains valid. The gateway 110 therefore maintains the expiry of the single timer as initialised. In other words, the gateway does not modify the single timer.

For example, for a first IP address in the table having $t0_1$=120 s as the instant of reception of a first NS address test message received and an associated test counter $c_1$, the table is empty when said first NS address test message is received, and the single timer is then initialised for a duration k=5 s. When another first NS address test message targeting a target IP address corresponding to a second IP address is received at $t0_2$=122 s, the table is not empty and the timer remains unchanged.

Figure 6:
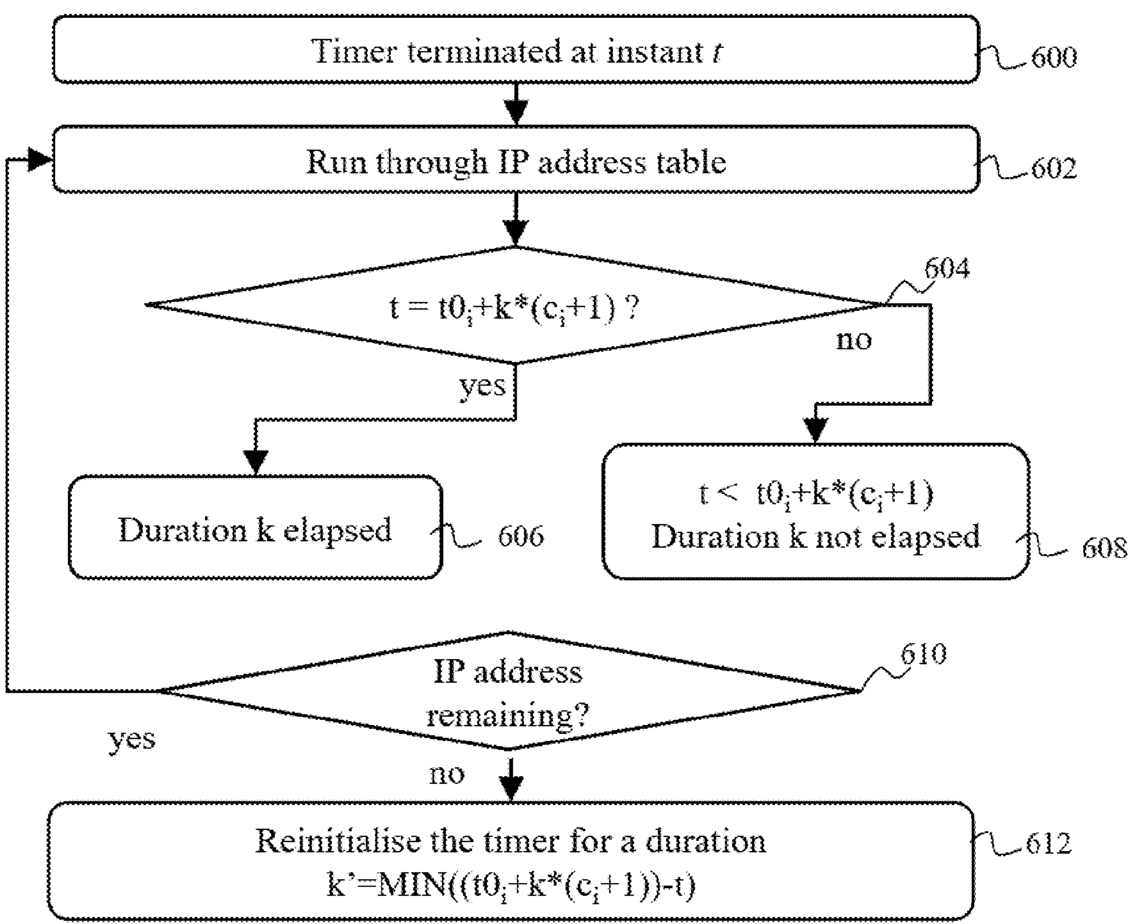
FIG. 6 illustrates schematically a second phase of the method for managing the single timer making it possible to measure a period of duration k, according to one embodiment.

FIG. 6 illustrates schematically a second phase of the method for managing the single timer making it possible to measure the second period of duration k for all the IP addresses in the table, according to one embodiment.

In a first step 600, the gateway 110 detects that the single timer is terminating, at an instant t.

In a following step 602, the gateway 110 runs through the table of IP addresses and selects an IP address in said table. For example, the gateway 110 selects an IP address of rank i=m, m being a counter initialised to 1. The gateway next increments the counter m by one unit so that, if the step 602 is subsequently performed once again, the gateway 110 selects the test address of following rank i+1.

In a step 604, the gateway 110 determines whether the instant t corresponds, for the IP address selected, in other words for the IP address of rank i in the table, at an instant $t0_i+k*(c_i+1)$, $t0_i$ being the instant of reception of the first NS address test message targeting the IP address of rank i, and $c_i$ being the test counter recorded in association with the IP address of rank i. If such is the case, a step 606 is performed. Otherwise a step 608 is performed.

At the step 606, the gateway 110 considers that, for the IP address selected, the second period of duration k has elapsed. The gateway 110 can then validate the step 408 of the method for determining whether or not an IP address is attributed to a terminal and perform the step 410. The gateway 110 next performs a step 610.

At the step 608, the instant t is less than $t0_i+k*(c_i+1)$ for the IP address selected, of rank i. The gateway 110 then considers that the second period has not elapsed and cannot, for the IP address selected, validate the step 408 of the method for determining whether or not an IP address is attributed to a terminal. The gateway 110 next performs the step 610.

At the step 610, the gateway 110 checks whether there exists at least one IP address in the table that has not yet been selected. If such is the case, the gateway 110 reiterates the step 602 in order to select a new IP address in the table. Otherwise the gateway 110 performs the step 612.

At the step 612, the gateway reinitialises the single timer for the duration k' calculated by taking into account all the IP addresses in the table. The duration k' is calculated as the minimum of the durations $k_i=(t0_i+k*(c_i+1))-t$.

For example, considering the first IP address in the table, of rank 1, having $t0_1=120$ s as the instant of reception of the first NS address test message and a test counter $c_i$ associated with the second IP address in the table, of rank 2, having $t0_2=122$ s as the instant of reception of the NS address test message and a test counter $c_2$, the single timer is first of all initialised for the duration k=5 s at $t0_1=120$ s. When the timer terminates for the first time, at t=125 s, the gateway 110 first of all selects the first IP address in the table. In this case, t=125 $s=t0_1+k*(c_1+1)$. The duration k has therefore elapsed for the first IP address in the table, for which the step 408 is validated, and the test counter $c_i$ is incremented by one unit. The gateway 110 next selects the second IP address in the table. In this case, t=125 s is less than $t0_2+k*(c_2+1)=127$, and therefore the step 408 is not validated for the second IP address. Considering that all the IP addresses in the table having been processed, the timer is reinitialised for a duration $k'=MIN((t0_i+k*(c_1+1))-t)$, i.e. for a duration k'=2 s. When the timer terminates for a second time, at t=127 s, the instant t is such that, for the first IP address in the table, $t>t0_1+k*(c_1+1)=130$ s, and therefore the step 408 is not validated for said first IP address. For the second IP address in the table, $t=t0_2+k*(c_2+1)$ and therefore the step 408 is validated for said second IP address and the test counter $c_2$ is incremented by one unit.

Figure 7:
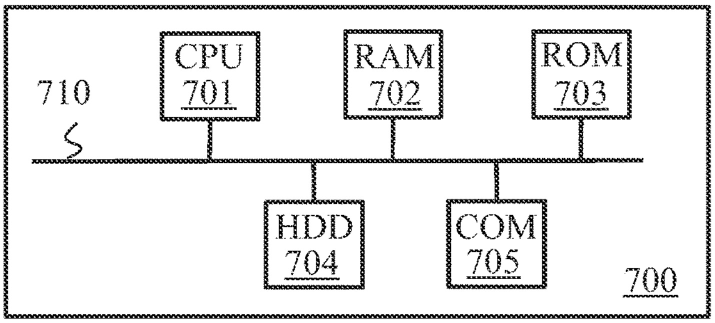
FIG. 7 illustrates schematically a hardware architecture of the gateway, according to one embodiment.

FIG. 7 illustrates schematically a hardware architecture of a control unit 700 of the gateway 110 or of a terminal 121, according to one embodiment.

The control unit 700 then comprises, connected by a communication bus 710; a processor or CPU (central processing unit) 701; a random access memory RAM 702; a read only memory ROM 703; a storage unit 704, such as a hard disk HDD (hard disk drive), or a storage medium reader, such as an SD (Secure Digital) card reader; and an interface COM 705 for communicating with network peripherals.

The processor CPU 701 is capable of executing instructions loaded in the RAM 702 from the ROM 703, from an external memory (such as an SD card), from a storage medium, or from a communication network. When the control unit 700 is powered up, the processor CPU 701 is capable of reading instructions from the RAM 702 and executing them. These instructions form a computer program causing the implementation, by the processor CPU 701, of all or some of the steps described here in relation to the gateway 110 or the terminal 121 for the control unit of the gateway 110 or the control unit of the terminal 121 respectively.

All or some of the steps can thus be implemented in software form by executing a set of instructions by the programmable machine, such as a DSP (digital signal processor) or a microcontroller, or be implemented in hardware form by a machine or a dedicated component, such as an FPGA (field-programmable gate array) or an ASIC (application-specific integrated circuit). In general terms, the gateway 110 and/or any terminal 121 comprises electronic circuitry adapted and configured for implementing the steps described here in relation to the gateway 110 and/or a said terminal 121 respectively.

The invention claimed is:

1. A method for determining whether an IP address is attributed in a communication network comprising at least one gateway, said method being implemented by the gateway and comprising:

receiving, by the gateway, a plurality of messages exchanged by means of an IP protocol in the communication network;

generating, by the gateway, a filter for extracting first address test messages of the plurality of messages, each first address test message targeting a target IP address and requesting any terminal to which the target IP address is attributed to send an address-signalling message in response to receiving said first address test message;

receiving, by the gateway, a first address test message targeting a target IP address;

in response to receiving the first address test message:

recording, by the gateway, said target IP address in a table managed by the gateway;

initializing, by the gateway, a timer of a predefined time interval k;

sending, by the gateway, in the communication network of the gateway, a predetermined number of second address test messages targeting a terminal having attributed said target IP address, wherein a subsequent sending of a second address test message targeting said target IP address is separated in time from a previous sending of a second address test message targeting said target IP address by the predefined time interval k;

for each sending of a second address test message targeting said target IP address:

awaiting, by the gateway for the predefined time interval k, reception of an address-signalling message responding to the second address test message from a terminal having attributed said target IP address;

determining, by the gateway, that the target IP address is attributed to a terminal in response to receiving an address-signalling message having said target IP address as its source IP address;

in response to determining that the target IP address is attributed to the terminal:

obtaining, by the gateway from the address-signalling message having said target IP address as its source IP address, a MAC address of said terminal;

generating, by the gateway, a firewall pinholing rule associated with said terminal identified by its MAC address; and deleting, by the gateway, the target IP address from the table managed by the gateway;

determining, by the gateway, that the target IP address is not attributed to a terminal if no address-signalling message having said target IP address as its source IP address is received in response to the sending of the second address test message targeting said target IP address; and deleting, by the gateway, the target IP address from the table managed by the gateway when the predetermined number of second address test messages targeting said target IP address have been sent by the gateway without any address-signalling message received in return.

2. The method according to claim 1, wherein each second address test message is sent to a global broadcast address, each terminal in the communication network receiving each message sent to said global broadcast address.

3. The method according to claim 1, wherein each second address test message is sent to a multicast address, said multicast address being defined by a predefined prefix and by the last n bits of the target IP address, n being a predefined integer, each terminal in the communication network the IP address of which ends in said last n bits is subscribed to said multicast address in order to receive each message sent to said multicast address.

4. The method according to claim 1, wherein each sending of a second address test message targeting the target IP address is done at an instant t such that $t=t0_i+k*(c_i+1)$, $t0_i$ being the instant of receiving the first address test message targeting said target IP address and $c_i$ being a test counter associated with said target IP address, the method further comprising:

on reception of the first address test message, recording said target IP address in the table in association with the instant $t0_i$ of reception of said first address test message and with the test counter $c_i$ initialised to zero, where i represents an input index of the table, and incrementing the test counter $c_i$ by one unit at each sending of a said second address test message targeting said target IP address.

5. The method according to claim 4, wherein a single timer is used for all target IP addresses recorded in the table, further comprising, for each target IP address recorded in the table:

initialising said single timer for the predefined time interval k at the instant $t0_i$ of receiving the first address test message targeting said target IP address only if the table managed by the gateway is empty when said first address test message is received;

when the single timer expires at the instant t, performing for each target IP address of index i recorded in the table:

determining if the instant t equals $t0_i+k*(c_i+1)$; and if the instant t equals $t0_i+k*(c_i+1)$, sending the second address test message targeting the target IP address of index i; and reinitialising the single timer for a duration k' such that $k'=MIN((t0_i+k*(c_i+1))-t)$ when the single timer expires.

6. The method according to claim 1, wherein for each first address test message targeting an IP address which is received, the timer is initialized at an instant $t0_i$ of receiving the respective first address test message, and wherein each sending of a second address test message targeting said target IP address is done when the timer expires, the method further comprising reinitialising said timer by the predefined time interval k at each sending by the gateway of a second address test message targeting said target IP address if the number of second address test messages targeting said target IP address that have been sent by said gateway is below the predetermined number.

7. The method according to claim 1, further comprising completing a neighbour table with said target IP address determined as being attributed to a terminal.

8. A non-transitory information storage medium, wherein it stores a computer program comprising instructions for implementing, by a processor, the method according to claim 1, when said program is executed by said processor.

9. A gateway configured for determining whether an IP address is attributed in a communication network comprising said gateway, the gateway comprising circuitry causing the gateway to perform:

receiving, by the gateway, a plurality of messages exchanged by means of an IP protocol in the communication network;

generating, by the gateway, a filter for extracting first address test messages of the plurality of messages, each first address test message targeting a target IP address and requesting any terminal to which the target IP address is attributed to send an address-signalling message in response to receiving said first address test message, receiving, by the gateway, a first address test message targeting a target IP address;

in response to receiving the first address test message:

recording, by the gateway, said target IP address in a table managed by the gateway;

initializing, by the gateway, a timer of a predefined time interval k;

sending, by the gateway in the communication network of the gateway, a predetermined number of second address test messages targeting a terminal having attributed said target IP address, wherein a subsequent sending of a second address test message targeting said target IP address is separated in time from a previous sending of a second address test message targeting said target IP address by the predefined time interval k;

for each sending of a second address test message targeting said target IP address;

awaiting, by the gateway for the predefined time interval k, reception of an address-signalling message responding to the second address test message from a terminal having attributed said target IP address;

determining, by the gateway, that the target IP address is attributed to a terminal in response to receiving an address-signalling message having said target IP address as its source IP address;

in response to determining that the target IP address is attributed to the terminal:

obtaining, by the gateway from the address-signalling message having said target IP address as its source IP address, a MAC address of said terminal;

generating, by the gateway, a firewall pinholing rule associated with said terminal identified by its MAC address; and deleting, by the gateway, the target IP address from the table managed by the gateway;

determining, by the gateway, that the target IP address is not attributed to a terminal if no address-signalling message having said target IP address as its source IP address is received in response to the sending of the second address test message targeting said target IP address; and deleting, by the gateway, the target IP address from the table managed by the gateway when the number of second address test messages targeting said target IP address have been sent by the gateway without any address-signalling message received in return.

* * * * *